United States Patent [19]
Rioux et al.

[11] 3,885,213
[45] May 20, 1975

[54] MEASURING PROBE FOR INTENSE AND VARIABLE ELECTRIC CURRENTS

[75] Inventors: Françoise Rioux; Christian Rioux, both of Cachan, France

[73] Assignee: Agence Nationale de Valorisation de la Recherche, Paris, France

[22] Filed: Jan. 9, 1973

[21] Appl. No.: 322,177

[30] Foreign Application Priority Data
Jan. 14, 1972  France .............................. 72.01226

[52] U.S. Cl. ............................ 324/127; 324/117 R
[51] Int. Cl. ............................................ G01r 1/22
[58] Field of Search ........................ 324/127, 117 R

[56] References Cited
UNITED STATES PATENTS

| | | | |
|---|---|---|---|
| 1,589,812 | 6/1926 | Miller ................. | 324/127 |
| 2,494,206 | 1/1950 | Ross ..................... | 324/127 |
| 3,168,698 | 2/1965 | Goody et al. ........ | 324/127 |
| 3,434,052 | 3/1969 | Fechant ................ | 324/127 |

OTHER PUBLICATIONS
Catalog 3000A, 1970, p. 9, Simpson Electric Co., Chicago, Ill..

*Primary Examiner*—Alfred E. Smith
*Assistant Examiner*—Ernest F. Karlsen
*Attorney, Agent, or Firm*—Larson, Taylor & Hinds

[57] ABSTRACT

The probe comprises a metallic wire formed into a core on itself or on an insulating coil and arranged so as to form a plurality of turns of the same cross section and distributed regularly along an axis. The coil is adapted to surround the conductor traversed by the variable current to be measured so that this current induces a measuring signal in said turns. The metallic wire is resistant to electric current being made, e.g., of at least 10% Ni and at least 30% Cr. The circuit of the metallic wire is closed by a resistance and capacitor in series, these components having low value relative to that of the metallic wire. First and second voltmeter means are provided at the terminals of the resistance and the capacitor respectively.

12 Claims, 4 Drawing Figures

MEASURING PROBE FOR INTENSE AND VARIABLE ELECTRIC CURRENTS

The present invention relates to a measuring probe for intense and variable electric currents. It relates more particularly to such a probe which comprises a metallic wire wound on itself or on an insulating core and arranged so as to form a plurality of turns of the same cross-section and distributed regularly along an axis, adapted to surround the conductor traversed by the variable current to be measured so that this variable current induces a measuring signal in said turns.

In a first type of known probe of this type called "Rogovski belt," the flexible metallic wire is of copper and therefore has a low electrical resistance; this belt is used to determine the voltage induced in the turns by the variable current to be measured. This voltage is proportional to the variation of the intensity $I$ of the current with time, $dI/dt$. This quantity $dI/dt$ must not have too high a value in order that a prohibitive voltage should not appear, which voltage would be difficult to measure.

This known probe is hence not usable when the intensity $I$ of the current to be measured is too high and/or when said current varies too rapidly or, in other words, when its frequency is too high. Moreover, the measurement of high voltage generally necessitates the use of a connecting cable between the probe and the measuring means; this cable and these measuring means have their own capacities which limit the cut-off frequency of the apparatus. Such known probes have a maximum cut-off frequency of the order of megahertz, namely a maximum frequency in use of some hundreds of kilohertz. Such probes lastly, which are used in open circuit and measure a representative magnitude of a derivative $dI/dt$ necessitate calculations or complicated apparatus to obtain the intensity $I$ of the current to be measured.

In a second type of known probe of the type concerned called "current transformer" or "full screen probe," the metallic wire must form a screen for the magnetic field; this metallic wire is hence wound on an iron core (or the like) which considerably increases the weight and the bulk of these apparatus.

In addition, such a conductive core introduces interfering capacities which considerably limit the maximum cut-off frequency of the probe.

These probes, lastly, which are used in closed circuit, measure directly the intensity $I$ of the current to be measured.

It is an object of the invention to enable the production of measuring probes for intense and variable currents which do not have the aforementioned drawbacks of known probes. It is a particular object of the invention to provide such a probe which can be used for the measurement of currents with rapid variation and of high intensity and of which, moreover, the bulk is reduced. It is a further object of the present invention to provide such a probe which enables at the same time the measurement of intensities $I$ of such currents and their derivative $dI/dt$ with respect to time and which are of particularly easy construction.

The probe according to the invention is characterized by the fact that the metallic wire is resistant and, advantageously, formed of a material which has a high resistivity; preferably, this material is such that the coefficient of variation of its resistivity as a function of temperature is low. Said metallic wire is advantageously thin.

In the preferred embodiment of the probe according to the invention, the circuit formed by the turns of the resistant metallic wire is closed by a resistance and a capacitor in series, this resistance and this capacitor having, respectively, a value and an impedance which are low with respect to the value of the resistance of the resistant metallic wire, first and second voltmeter means being provided, respectively at the terminals of said resistance and of the capacitor.

Other features, characteristics and advantages of the invention will appear below in the course of the following more detailed description of preferred embodiments according to the invention, with reference to the accompanying drawings, given of course purely by way of illustrative but non-limiting example, and in which.

According to the invention and more especially, according to those types of application as well as according to those embodiments of its various parts to which it would appear that preference should be given, in order to produce a probe for measuring intense and rapidly varying electric currents, procedure is as follows or in analogous manner.

Figure 1:
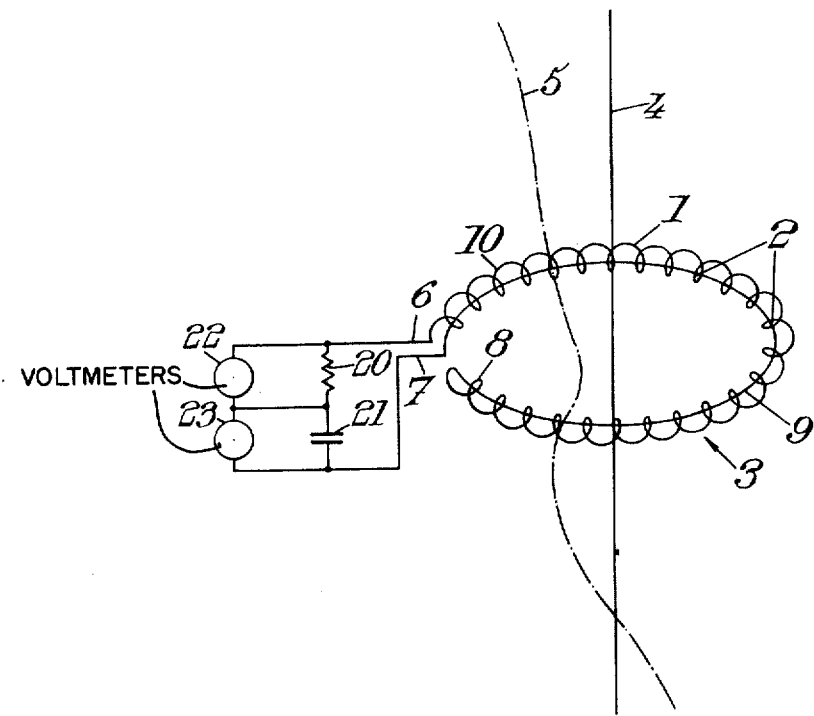
FIG. 1 shows one embodiment of the probe according to the invention.

In manner known in itself, this probe comprises a metallic wire 1 which is wound on itself (that is to say without a core) so that it forms a plurality of turns 2. These turns 2 must all have the same surface and be distributed regularly; in other words, the distance between two consecutive turns must be constant. More generally, it suffices that the product of the surface of one turn and its distance to the following one be constant. In the example shown in FIG. 1, these turns are substantially circular and of the same diameter and thus form a cylinder which is deformed to constitute a torus 3 which surrounds the conductor 4 traversed by the electric current to be measured. In FIG. 1, there is shown, in solid lines, the conductor 4 borne by the axis of symmetry of the torus 3 and, in mixed lines, a conductor 5 which is not borne by said axis of symmetry.

The electrical current of a variable intensity which traversed the conductor 4 (or 5) produces a magnetic field whose flux variations through the turns 2 induce a voltage at the terminals of each of these turns.

The metallic wire 1 is, according to the invention, a resistant wire. A first feature enabling the obtaining of a resistant wire is to produce the latter of metal, advantageously an alloy whose resistivity $\rho$ is high. It is advantageous to select such a resistivity $\rho$ at least equal to 50 $\mu\Omega$-cm. Preferably, the coefficient of variation with temperature, of this resistivity, is low.

Alloys which are particularly suitable for the probes according to the invention are alloys composed of nickel and of chromium which comprise between 10 and 30% of chromium. In a particular embodiment, the resistant wire is formed with an alloy known under the trademark "EVANOHM" (manufactured by the Company GILBY-FODOR); this alloy contains about 22% of chromium and 78% of nickel. This alloy has a resistivity $\rho$, a coefficient $\alpha$ of variation of this resistivity with temperature which are, respectively:

$\rho = 1.33.10^{-6} \; \Omega-m$    and
$\alpha = 2.10^{-5}/°C$.

Other alloys based on nickel and chromium may be suitable such as, for example, those known under the trademark "TOPHET" (manufactured by the Company GILBY-FODOR) or those known under the trademarks "KARMA" and "NIKROTHAL."

A second feature important for the production of a resistant wire is to confer on this wire a small cross-section. Thus, the bulk and the weight of this wire are reduced and especially, as will be seen below, the cut-off frequency has a high value.

The circuit formed by the resistant metallic wire is, according to the invention, closed by a measuring impedance arranged at the ends 6 and 7 of said resistant wire 1 and which will be discussed below. This measuring impedance is advantageously of negligible value with respect to the resistance of the metallic wire 1; thus, the points 6 and 7 are practically in short-circuit and the intensity of the current which passes through said measuring impedance, which is the short-circuiting current of the wire 1, is proportional to the derivative $dI/dt$ of the intensity $I$ of the current which passes through the conductor 4 (or 5).

Considering firstly the case where it is the conductor 4 which is traversed by a current. By reason of the symmetry of the assembly and due to the fact that the turns are all of the same area, the current of intensity $I$ which passes through the conductor 4 induces, in these turns 2, electromotive forces equal to $U_s$. The metallic wire 1 is wound into N turns, this electromotive force $U_s$ is then substantially the Nth part $U/N$ of the total electromotive force which appears between the points 6 and 7; the turns 2 all having substantially the same diameter, they hence present the same electrical resistance $R_s$; the voltage $V_s$ which appears at the terminals of each turn is, thus:

$$V_s = U_s - R_s i = 0$$

in other words, the voltages created by induction in each turn are annulled by the ohmic voltages, the circuit being closed.

If one considers now, in the second place, the case where the conductor 5 is traversed by current, the variation of this current induces different electromotive forces in each turn and the voltage $V_s$ at the terminals of one turn will not be, generally, nil. It will be noted however that, the total voltage U which appears between the points 6 and 7 is independent of the shape and of the position of the conductor traversed by the current to be measured. To reduce or even to annul the voltage appearing at the terminals of each turn, there may be provided, according to the invention, homogenising means for the magnetic field produced, at the level of the turns, by the electric current to be measured. These homogenising means will be described in more detail below. However, as in the preceding case, the wire being resistant, the electromotive forces introduced are, to a great extent, compensated by the ohmic voltages.

The high resistivity of the metallic wire of the probe confers additional advantages.

In fact, simple calculation shows that the elevation of temperature of the wire of the probe is, for a same variable current $I(t)$ to be measured, inversly proportional to the resistivity $\rho$ of this wire. If this resistivity is high, this elevation in temperature will hence be slight.

Other advantages conferred by the high value of the resistivity will appear below in the present description.

The impedance arranged between the points 6 and 7 is advantageously constituted by a measuring resistance 20 in series with the capacitor 21; this measuring resistance will have, of course, a low value with respect to the resistance R of the metallic wire of the probe and, in the same way, the capacitor will have a negligible impedance with respect to the abovesaid resistance R. Voltmeter means, respectively 22 and 23, are used to measure the voltage at the terminals, on one hand, of the measuring resistance 20 and, on the other hand, of the measuring capacitor 21.

It has already been seen that the current which traverses the abovesaid measuring resistance, has an intensity $i$ proportional to the derivative (with respect to time) $dI/dt$ of the intensity of the current to be measured. The voltage measured at the terminals of this resistance hence gives a measurement of this derivative.

The voltage measured at the terminals of the measuring capacitor which also is low with respect to the electromotive force induced in the flexible metallic wire, is written as follows.

$$V_c = 1/C \int i \, dt$$

now, since the intensity $i$ is proportional to the derivative $dI/dt$, this voltage $V_c$ is proportional to the said current to be determined.

The capacity C of the capacitor must be selected so that it verifies the following relationship:

$$RC >> \tau'$$

R being the resistance of the wire of the probe and $\tau'$ substantially the duration of each pulse of the current to be measured. $1/RC$ represents, in a way, a cut-off frequency on the side of the low frequencies for the measurement of the intensity $I$ (and not for $dI/dt$).

It will be appreciated that with this arrangement, contrary to current measuring probes of the prior art, with an extremely simple and inexpensive assembly, there can be measured at the same time the current and its derivative with respect to time.

Figure 3:
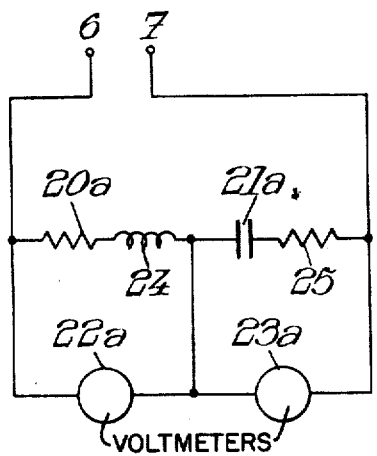
FIG. 3 represents a measuring impedance according to the invention.

FIG. 3 shows a modification of this measuring impedance which is adapted to be arranged between the terminals 6 and 7.

According to this modification, there is arranged an inductance 24 in series with the measuring resistance 20a, the voltmeter means 22a being installed at the terminals of these elements in series. The values Lm and Rm of this inductance 24 and of the resistance 20a are selected so that $Lm/Rm \approx L/R$, L and R being respectively the inductance and the resistance of the wire of the probe. This feature enables the band-pass of the probe according to the invention to be further increased, especially on the high frequency side. Again to enable the band-pass of the probe to be increased, there is arranged a resistance 25 in series with the capacitor 21a; the voltmeter means 23a are installed at the terminals of these elements 21a and 25 in series. The value $r_m$ of the resistance 25 and the capacity $c_m$ of the capacitor $21a$ are selected so as to obey the following relationship:

$$r_m c_m \approx L/R.$$

To obtain good accuracy in the measurement of the intensity $I$ of the current, it is necessary that the proportionality of the intensity $i$ of the short-circuiting current to the derivative $dI/dt$ be as exact as possible. It is therefore especially advantageous, that the induced flux of the magnetic field created, as a result of the current induced in the wire 1 itself, be as small as possible (in other words, the ratio $L/R$ of the inductance $L$ of the wire of the probe at resistance $R$ of this wire must be low with respect to the magnitude $\tau$, which will be defined below). Calculation shows that this condition is expressed by the relationship:

$$Ni \ll I$$

or again:

$$N/2\eta R_1 \cdot r \cdot s/\rho \ll \tau$$

in this last relationship: $R_1$ is the average radius of the ring of the torus 3, $r$ its small radius, that is to say the radius of the turns 2; $s$ is the cross-section of the wire 1, $\rho$ its resistivity; $1/\tau$ is the frequency of the variation of the current to be measured if the latter is sinusoidal; if this variation is not sinusoidal, the quantity $\tau$ can be defined, in the case where this current is presented in the form of pulses, by the relationship: $Io/\tau = (dI/dt)_{max}$.

in which relationship $Io$ is the maximum amplitude of the said pulses and the $(dI/dt)_{max}$ the maximum value of the derivative $dI/dt$.

From the relationship (1) above, there is obtained firstly an additional advantage and particularly important of the choice of a high resistivity $\rho$ and of a small cross-section $s$ since, for the same frequency, the accuracy is all the more improved as the ratio $s/\rho$ is low; in addition, for a same accuracy, the maximum frequency, for which the measurement is possible with this accuracy, will be all the higher as the said ratio $s/\rho$ is lower.

It is also deduced from the relationship (1) that the quantity $2\eta R_1/N$ must have a high value. Now, this quantity represents the distance between turns, it is hence advantageous that this distance be large, or again that the number $N$ of the turns be not too high.

It is to be noted that the skin effect, which has as a consequence of variation in the resistance of a conductor with frequency, would be troublesome to the measurements if it appeared for the wire of the probe. This effect does not appear by reason of the high value of the resistivity $\rho$ and of the small cross-section $s$ of the wire. As regards the measuring resistance, it must be selected so as not to be subject to this skin effect.

According to another feature of the invention which has also the object of improving the band-pass of the probe, the resistivity $\rho$ of the wire of the probe, expressed in $\Omega-m$, the average radius $R_1$ of the ring of the torus, expressed in meters, and the cross-section $s$ of said wire of the probe, expressed in $m^2$, obey the following relationship.

$$\rho R_1/s \approx 10.$$

To come back to the probe shown in FIG. 1, it is seen that the end wire of the last turn 8 comes back along a path 9 through all the turns to the point 7. Said path 9 passes, preferably, through the center of the turns. This path 9 of the return wire enables the annulation, or reduction to a great extent of the electromotive forces induced by the component normal to the plane of the ring of the torus 3, of the magnetic field created by the current to be measured. In fact, said normal component induces, in the junction wire 10 between the turns, a first electromotive force and, in the return wire, a second electromotive force. These two electromotive forces produce currents of reverse directions, they hence are compensated. It will be noted that the return wire would have to have a negligible resistance with respect to that of the wire 1 in order not to modify the abovesaid intensity $i$ of the short circuit current. For this reason, this return wire is advantageously constituted by a copper wire.

Figure 2:
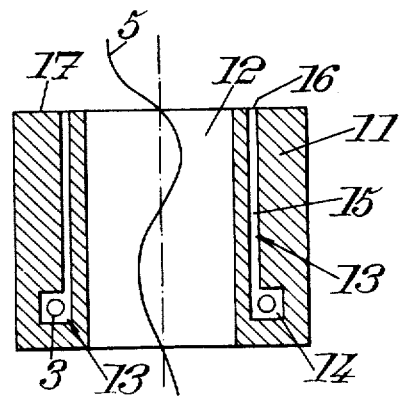
FIG. 2 illustrates means, according to the invention, adapted to enable the homogeneization of the magnetic field created at the level of the turns by a current borne by a conductor which does not coincide with the axis of symmetry of the torus formed by the metallic wire.

There is shown in FIG. 2, in longitudinal section, means intended to homogenise the magnetic field produced in the turns of the probe by the current to be measured circulating in a conductor 5 which does not coincide with the axis of symmetry of the torus 3.

These homogenizing means are constituted, according to the invention, by a metallic block 11, advantageously of copper. This metallic block 11 has a central opening 12 relatively wide and which passes through said block in its length for the passage of the conductor 5. The block 11 is, besides, pierced by a cavity 13 which comprises a first portion 14 intended to receive the metallic wire 1 of the probe wound in the form of a torus 3. This first portion 14 of the cavity 13 therefore surrounds the conductor. The cavity 13 comprises a second portion 15 elongated and relatively narrow; this portion 15 extends the first portion 14 and opens from the block 11 along an opening 16 of relatively narrow width. Said portions 14 and 15 of the cavity 13 form a continuous crown around the conductor 5 in order that the magnetic field created by the current which passes through this conductor may be able to penetrate into the portion 14 and be uniform in this portion.

In the embodiment of said homogenizing means as shown in FIG. 2, the block 11 has the shape of a cylindrical crown and the second portion 15 of the cavity 13 is elongated in the longitudinal sense, that is to say parallel to the axis of said crown, the opening 16 occurring therefore on a flat surface 17 which has a direction perpendicular to the axis of the crown. Experience and calculation show that the homogenization, at the level of the turns of the probe, of the magnetic field created by the current which passes through the conductor 5 can also be improved when the second portion 15 of the cavity 13 is widened over a limited length between the opening 16 and the first portion 14 (this feature is not shown in FIG. 2).

In a particular embodiment of the invention (not shown), the wire 1 is wound on an insulating core and held on this core by means of an insulating substance known under the trademark "ARALDITE."

In another embodiment of the invention, especially interesting when the wire 1 includes a return path 9, the insulating core is separated into two parts by a hinge. With this feature, the probe operates like a clamp adapted to surround the conductor traversed by the current to be measured, the measurement being able to be effected without necessity of interrupting the supply of said conductor for the installation of the probe.

The probe which has just been described is convenient for measuring intense currents with a particularly rapid variation. In a particular embodiment of the invention, it has been possible to measure currents of intensity $I = 10^5$ A. and such that $\tau = 1$ µs., with the following parameters:

| | |
|---|---|
| wire of "EVANOHM" | |
| radius $R_1$ of the ring of the torus | $R_1 = 5$ cm |
| radius of each turn | $r = 2.5$ mm |
| $R_s = 7.4$ Ω (value of the resistance of | each turn) |
| diameter of the wire 1 | $\phi = 0.06$ mm |
| N = 300 turns | |
| distance $x$ between turns | $x = 1$ mm |
| value of the measuring resistance | $R_m = 10$ Ω |
| capacity C of the measuring capacitor | $C = 0.2$ µF. |

For the abovesaid current ($I = 10^5$ A., $\tau = 1$ µs.), the following values were obtained for the voltage $V_R$ at the terminals of the measuring resistance: $V_R \approx 10$ V., and the value $V_C \approx 5$ V., was obtained for the voltage at the terminals of the measuring capacitor. The cut-off frequency of such a probe is of the order of 40 megahertz.

In another particular embodiment which could enable the measurement of a current of intensity $I = 10^7$ A. and such that $\tau = 1$ µs., the following parameters were adopted for the probe:

wire of "EVANOHM"

$R_1 = 30$ cm, $r = 1$ cm diameter of wire 1, $\phi = 25\mu$ $R_s = 171$ Ω

$N = 1,000 \quad x = 2$ mm $R_m = 2$ Ω $\quad C = 1$ µF.

The calculation shows that for the said current ($I = 10^7$ A. and $\tau = 1$ µs.), there would be obtained the following measuring voltages $V_R$ and $V_C$:

$$V_R \approx 25 \text{ V.}$$

$$V_C \approx 12 \text{ V.}$$

the cut-off frequency of the latter probe is of the order of 150 megahertz.

It will be noted that the probes which have just been described are of fairly small size and of very low weight.

Figure 4:
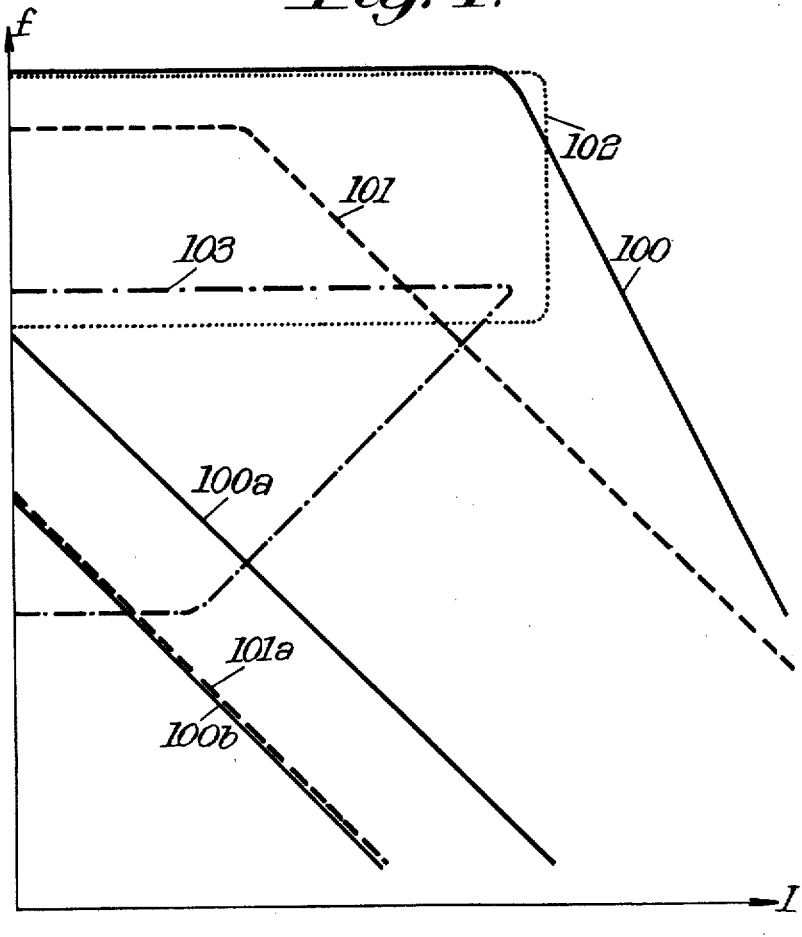
FIG. 4 is a diagram illustrating the performances of the probe according to the invention, in comparison with the probes of the prior art.

In order to show the advantages of the probe which has just been described, there is shown lastly in FIG. 4, a diagram illustrating the extreme ranges of use of said probe. There has also been shown on this Figure the ranges of use of known probes. In this Figure there is borne as abscissae the intensities of the currents to be measured and as ordinates the frequencies (or the like) of these currents. The comparison curves which appear in this Figure relate to probes which are all substantially of the same dimensions.

The curve 100, in solid line, represents the upper limit of use of the probe according to the invention and the line 100a represents the lower limit of use of the probe for intensity measurements, whilst the line 100b, also in a solid line, shows the lower limit of use of the probe for measurements of the derivatives $dI/dt$. The curve 101, in interrupted line, represents the upper limit of use of a probe of the Rogovsky belt type, the line 101a, also in interrupted line, represents the lower limit of use of the same Rogovsky belt. The curves 102, (in dotted line) and 103 (in mixed line) illustrate the areas of use respectively of a full screen probe and of a current transformer. It is seen in this FIG. 4 that the probe according to the invention is especially advantageous in the range of high intensities and frequencies.

The probe according to the invention can lend itself to numerous applications and it is particularly suitable for the measurement of the intensities of currents supplied by capacitator banks.

As is self-evident and as emerges already from the foregoing, the invention is in no way limited to those of its types of application and embodiments which have been more especially envisaged; it encompasses, on the contrary, all modifications.

We claim:

1. Probe for measuring intense and variable electric currents in a conductor, said probe comprising a metallic wire coil having an insulating core and being arranged so as to form a plurality of turns of the same cross-section which are distributed regularly along an axis adapted to surround the conductor traversed by the variable current to be measured so that the variable current induces a measuring signal in said turns, said metallic wire coil comprising first and second end terminals, and a measuring impedance being directly arranged between said terminals, said measuring impedance comprises a resistor and a capacitor connected in series, a first volt meter means being connected across said resistor and a second volt meter means being connected across said capacitor, the value of the resistance of said metallic wire being at least ten times greater than the value of said measuring impedance.

2. Probe as claimed in claim 1 wherein said insulating core comprises an air core.

3. Probe according to claim 1, wherein said resistivity of said coil is at least equal to 50 µΩ-cm.

4. Probe according to claim 3, wherein said wire comprises an alloy of nickel and of chromium comprising at least 10 and at the most 30% of chromium.

5. Probe according to claim 1, wherein the cross-section of the metallic wire is slight.

6. Probe according to claim 1, wherein said coil is in the form of a torus and wherein the resistivity $\rho$ of said wire expressed in Ω-m, the radius of said axis of said coil expressed in meters and the cross-section $s$ of the wire of the probe expressed in $m^2$ obey the following relationship:

$$\rho R_1/s \approx 10.$$

7. Probe according to claim 1, wherein the coefficient of variation of resistivity of the constituent material of the metallic wire as a function of temperature is low.

8. Probe according to claim 1, wherein said resistance and this capacitor have, respectively, a low value and a low impedance relative to the value of the resistance of said metallic wire, the first voltmeter means being adapted to give a representative indication of the variation as a function of time of the intensity of the current to be measured and the second voltmeter means being adapted to give a representative indication of the intensity of said current to be measured.

9. Probe according to claim 8, wherein a measuring inductance is installed in series with said measuring resistance, the first voltmeter means being installed at the terminals of said resistance and of said inductance in series and the values $L_m$ and $R_m$ of this inductance and of this resistance satifying the following relationship.

$$L_m/R_m = L/R$$

$L$ and $R$ being respectively the values of the inductance and of the resistance of the wire of the probe.

10. Probe according to claim 8, wherein the capacity of the measuring capacitor is selected so that the product of this capacity and the value of the resistance of said metallic wire is large with respect to the duration of each pulse of the current to be measured.

11. Probe according to claim 1, comprising a return wire from the last turn of the coil to the first turn of the coil, said return wire being arranged inside the turns and having a low electrical resistance with respect to that of the wire constituting the turns.

12. Probe according to claim 1, comprising a cap constituted of a good conductor metal traversed by an opening intended for the passage of the conductor traversed by the current to be measured and pierced by a cavity comprising a first portion adapted to receive the metallic wire adapted to surround said conductor and a second portion extending the first portion and of smaller width, this second portion ending at the outer surface of said cap being arranged to allow the magnetic field created by the current to be measured, to penetrate into the first portion.

* * * * *